(12) United States Patent
Prestegard et al.

(10) Patent No.: US 10,735,806 B2
(45) Date of Patent: Aug. 4, 2020

(54) CONFIGURATION FOR DETECTING HARDWARE-BASED OR SOFTWARE-BASED DECODING OF VIDEO CONTENT

(71) Applicant: Disney Enterprises, Inc., Burbank, CA (US)

(72) Inventors: Derek L. Prestegard, Los Angeles, CA (US); Joseph Rice, Berkeley, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/125,250

(22) Filed: Sep. 7, 2018

(65) Prior Publication Data
US 2020/0084507 A1 Mar. 12, 2020

(51) Int. Cl.
| | |
|---|---|
| *H04N 21/233* | (2011.01) |
| *H04N 21/2343* | (2011.01) |
| *H04N 21/235* | (2011.01) |
| *H04N 21/2365* | (2011.01) |
| *H04N 21/24* | (2011.01) |
| *H04N 21/25* | (2011.01) |
| *H04N 21/258* | (2011.01) |
| *H04N 21/2662* | (2011.01) |
| *H04N 21/4143* | (2011.01) |
| *H04N 21/422* | (2011.01) |
| *H04N 21/442* | (2011.01) |
| *H04N 21/475* | (2011.01) |
| *H04N 21/647* | (2011.01) |
| *H04N 21/658* | (2011.01) |
| *H04N 21/845* | (2011.01) |
| *H04N 21/431* | (2011.01) |

(52) U.S. Cl.
CPC ....... *H04N 21/442* (2013.01); *H04N 21/4316* (2013.01); *H04N 21/8451* (2013.01)

(58) Field of Classification Search
None
See application file for complete search history.

(56) References Cited

U.S. PATENT DOCUMENTS

| | | | | |
|---|---|---|---|---|
| 2007/0156924 | A1* | 7/2007 | Ramalingam | ....... H04L 12/1822 709/246 |
| 2008/0141317 | A1* | 6/2008 | Radloff | .............. H04N 5/44582 725/87 |
| 2009/0028182 | A1* | 1/2009 | Brooks | ............... H04L 41/0896 370/466 |

(Continued)

*Primary Examiner* — Brian T Pendleton
*Assistant Examiner* — Jean D Saint Cyr
(74) *Attorney, Agent, or Firm* — Patterson + Sheridan, LLP

(57) ABSTRACT

A process receives, from a media content server, media content. Further, the process performs a first playback, with a processor at a media playback device, of one or more sample files corresponding to the media content. The one or more sample files each corresponds to a distinct codec format. In addition, the process determines, with the processor at the media playback device, a confidence score for each of the one or more sample files. The confidence score is associated with one or more factors indicative of the distinct codec format being software-based or hardware-based. Finally, the process performs a second playback, with the processor at the media playback device, of at least a substantial portion of the media content according to the distinct codec format that is hardware-based.

21 Claims, 6 Drawing Sheets

(56) References Cited

U.S. PATENT DOCUMENTS

| 2012/0201521 A1* | 8/2012 | Frojdh | H04N 19/70 |
| | | | 386/356 |
| 2012/0203796 A1* | 8/2012 | Abraham | H04W 4/185 |
| | | | 707/770 |
| 2014/0071819 A1* | 3/2014 | Gopalan | H04W 28/14 |
| | | | 370/230 |

* cited by examiner

CONFIGURATION FOR DETECTING HARDWARE-BASED OR SOFTWARE-BASED DECODING OF VIDEO CONTENT

BACKGROUND

1. Field

This disclosure generally relates to the field of video content.

2. General Background

When receiving video content for playback (e.g., via streaming, downloading, etc.), a playback device typically receives the video content in an encoded format. Further, the playback device executes a codec to decode the video content for playback. With the advent of higher resolution display devices (e.g., 4K televisions), video content developers are often left wondering what codec format to use for encoding the video content that is sent to the user via the playback device. As a result, current playback devices may perform decoding according to the codec selected by the developer, which may be inconsistent with the optimal codec for the particular playback device. Accordingly, current playback devices are not configured to perform optimal playback of video content.

SUMMARY

In one aspect, a computer program product comprises a non-transitory computer readable storage device having a computer readable program stored thereon. The computer readable program when executed on a computer causes the computer to receive, from a media content server, media content. Further, the computer is caused to perform a first playback, with a processor at a media playback device, of one or more sample files corresponding to the media content. The one or more sample files each corresponds to a distinct codec format. In addition, the computer is caused to determine, with the processor at the media playback device, a confidence score for each of the one or more sample files. The confidence score is associated with one or more factors indicative of the distinct codec format being software-based or hardware-based. Finally, the computer is caused to perform a second playback, with the processor at the media playback device, of at least a substantial portion of the media content according to the distinct codec format that is hardware-based. In an alternative aspect, a first playback may be interrupted, with the processor, prior to performing a second playback according to a distinct codec format.

In another aspect, the functionality performed by the computer readable program may be implemented by an apparatus. In yet another aspect, the functionality performed by the computer readable program may be implemented by a process.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A configuration detects whether a media player is performing a hardware-based native decoding (e.g., via hardware installed on a device chipset) or software-based decoding of video content. By determining the hardware-based capabilities of a corresponding media playback device (e.g., mobile device, connected TV, Blu-Ray player, personal computer, virtual reality apparatus, augmented reality apparatus, etc.), the media player may then determine whether to use hardware-based decoding or software-based decoding to optimize the functionality of the playback device and the viewer experience.

Figure 1:
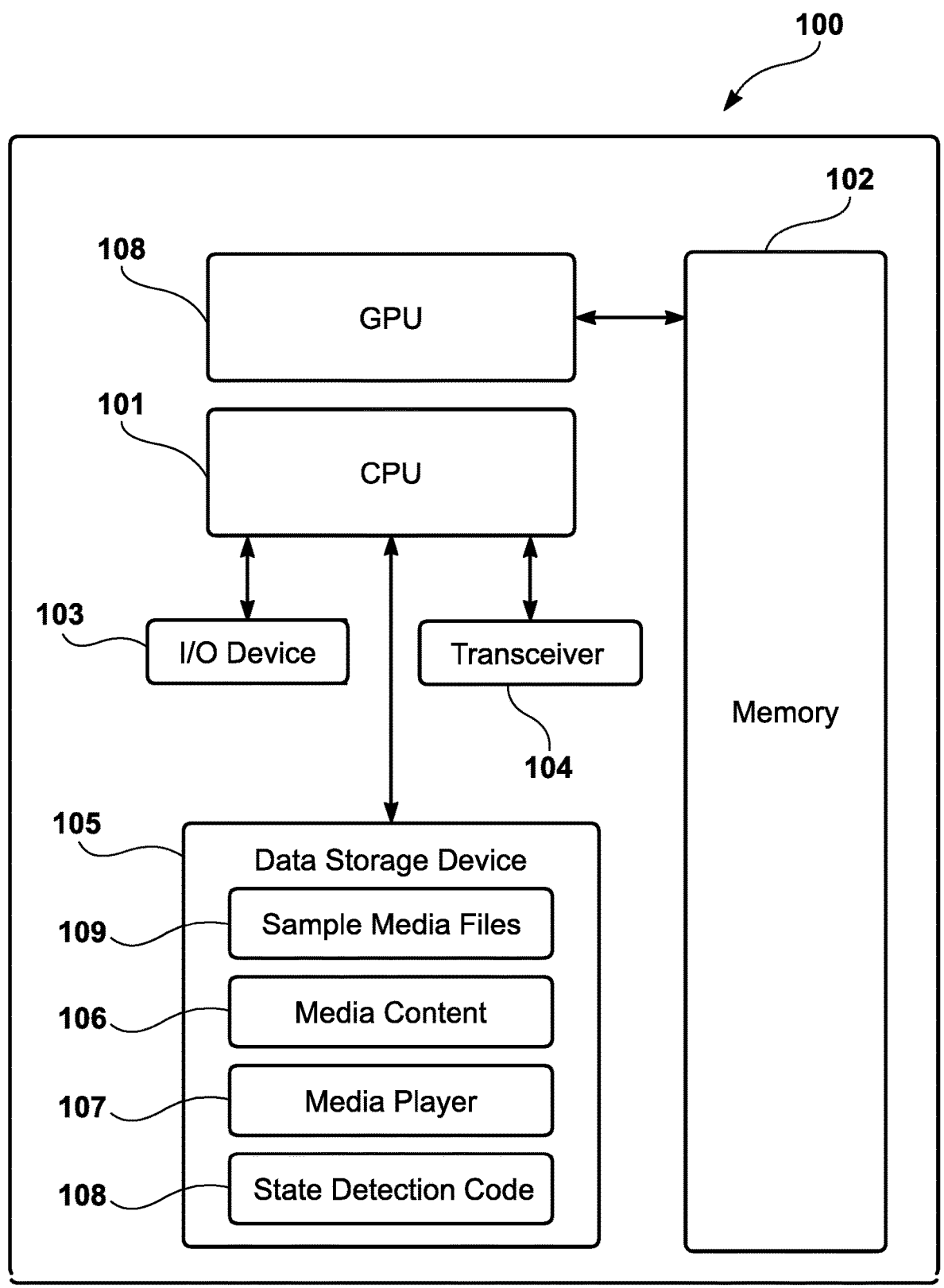
FIG. 1 illustrates a block diagram of the internal components of a media playback device that determines an optimal state for playback of content.

FIG. 1 illustrates a block diagram of the internal components of a media playback device 100 that determines an optimal state (i.e., hardware-based or software-based decoding) for playback of content. The media playback device 100 may have a central processing unit ("CPU") 101, a graphics processor unit ("GPU") 108, a memory device 102, a transceiver 104, input/output ("I/O") devices 103 (e.g., remote control, mouse, joystick, keyboard, etc.), and a data storage device 105.

Further, the data storage device 105 may store media content 106, a media player 107, state detection code 108, and/or sample media files 109. Examples of the media content 106 include, but are not limited to, movies, television shows, documentaries, video games, music, advertisements, etc. In addition, one or more sample media files 109, each corresponding to a particular codec format (e.g., High Efficiency Video Coding ("HEVC"), Advanced Video Coding ("MPEG-4 AVC"), AOMedia Video 1 ("AV1"), etc.), may be part of, or distinct from, the media content 106. The one or more sample files 109 may be associated with particular media content for playback. Further, the one or more sample files 109 may only be a fraction of the size of the corresponding media content 106. The media player 107 may be executed by the CPU 101 to perform playback of the media content 106, or corresponding sample media files 109.

In addition, the state detection code 108 may be executed by the CPU 101 to determine an optimal state (i.e., a particular codec format) for playback of particular media content 106. For instance, the CPU 101 may execute the state detection code 108 to analyze the one or more sample files 109 in the various codec formats. As a result, the CPU 101 may determine an optimal codec format (i.e., native hardware-based or software-based) for the particular media player 107 and the media playback device 100. For example, the CPU 101 may determine that AVC is the native hardware-based codec format for the media player 107 and the media playback device 100, whereas HEVC is the software-based codec format. Further, the CPU 101 may determine that using HEVC to perform video content decoding will result in significantly more battery drainage of the media playback device 100 than AVC because software-based decoding is often more battery-intensive than hardware-based decoding. Therefore, the CPU 101 may execute the media player 107 via the hardware-based codec (e.g., AVC) at a lower resolution than the software-based codec (e.g., HEVC) to improve the functionality of the media player 107 and the media playback device 100.

By way of contrast, previous media players were not configured to determine the type of codec that was native to the hardware as opposed to what codec was software-based. A reason for such lack of awareness by previous media players was that the chipset for two of the same playback devices could be configured to have different codec formats. For example, a hardware manufacturer may have implemented HEVC as the native hardware-based codec format on a first batch of playback devices, only to then implement AVC as the native hardware-based codec format on a second batch of playback devices. Accordingly, previous media players were often left unaware of a particular codec format native to the hardware of previous playback devices. As a result, previous media players often operated in an energy-inefficient and memory-inefficient manner.

On the other hand, the media player 107 illustrated in FIG. 1 improves the functionality of the CPU 101 and the memory device 102 by determining an optimal codec format. For instance, the CPU 101 may execute the state detection code 108 to run various queries/polls on system resources (e.g., CPU utilization, memory constraints, etc.) used by the media playback device 100 during playback of the one or more sample media files 109. In one aspect, the CPU 101 executes the state detection code 108 to compute a score based on one or more factors (e.g., system resources) being affected during playback of the one or more sample media files 109.

The one or more sample media files 109 may be composed to provide a substantial level of computational intensity for a short duration of time, relative to the length of the media content 106. For example, the one or more sample media files 109 may be high resolution files (e.g., 4K, 1080i, 720p, etc.) such that the difference in execution of resources by a software-based codec, as opposed to a hardware-based codec, will be apparent.

Examples of the one or more factors include, but are not limited to, CPU utilization, memory constraints, data received from the operating system of the media playback device 100, a version of the operating system, a model number of the media playback device 100, a canary process (i.e., minimal testing of functions to determine aberrations), data received from thermal sensors (e.g., CPU temperature), type of the media content 106 (e.g., main content or extras), and/or length of the media content 106. For instance, execution of a software-based, as opposed to a native hardware-based, codec is often associated with a CPU spike. Accordingly, the CPU 101, when executing the state detection code 108 on the various sample media files 109, may determine which of the sample media files 109 are causing CPU spikes and which are not. This factor, in addition to one or more other factors, may be used to generate the confidence score (i.e., the level of confidence that a particular sample media file 109 is encoded according to a native hardware-based, or software-based, codec).

In one aspect, the confidence score may be determined by tabulating a sub-score associated with each factor. In another aspect, the sub-scores may be weighted. For example, the CPU utilization factor may be assigned a higher weight than the model number of the media playback device 100.

Further, a predetermined tolerance threshold may be established for the confidence score (i.e., the total of the sub-scores, weighted or un-weighted). If the sample media file 109 has a confidence score that exceeds the predetermined tolerance threshold, the codec format for the sample media file 109 may be deemed to be software-based; as opposed to hardware-based if below the predetermined tolerance threshold.

In one aspect, the CPU 101 executes the state detection code 108 to determine the state prior to playback of the media content 106, or at least the substantive portion of the media content 106. In another aspect, the CPU 101 may continue to execute the state detection code 108 during playback of the media content 106. For instance, the media content 106 may be streamed to the media playback device 100 such that a first portion is encoded according to HEVC, whereas a second portion is encoded according to AVC. The CPU 101 may monitor the playback of the media content 106 to determine if the confidence score exceeds the predetermined tolerance threshold. For example, a CPU utilization spike may occur after a change mid-stream from the native hardware-based codec format from HEVC to AVC. As the media player 107 may be using an HEVC codec to avoid battery drainage, as determined, for example, by the sample media file 109 analysis, the media player 107 may still be using the HEVC codec when the factors change mid-stream. Accordingly, the CPU 101 may determine, through continuous monitoring, such a change and modify the state.

Figure 2:
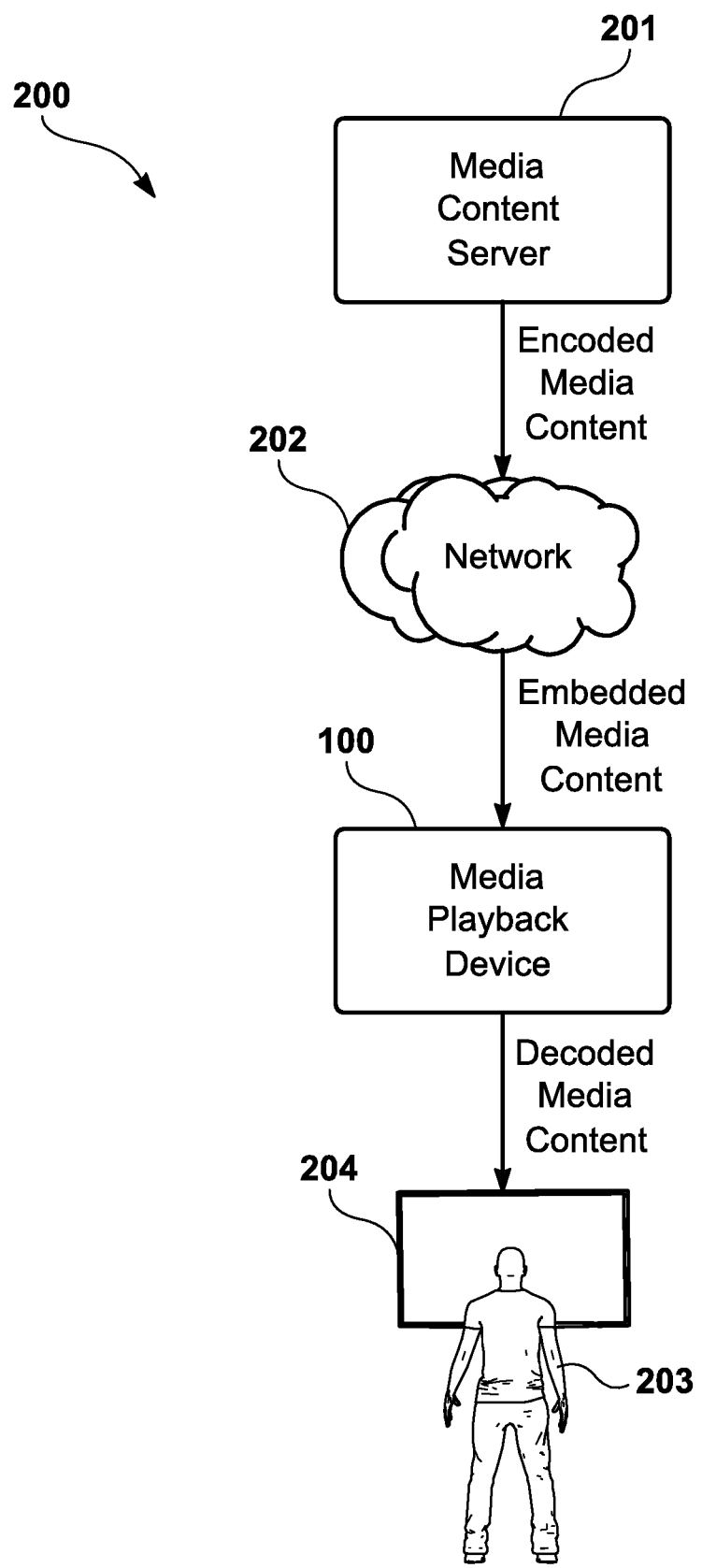
FIG. 2 illustrates a system that uses the media playback device illustrated in FIG. 1 to decode the media content.

FIG. 2 illustrates a system 200 that uses the media playback device 100 illustrated in FIG. 1 to decode the media content 106. In one aspect, the media playback device 100 receives the encoded media content 106 from a remote media content server 201 via a computerized network 202. Further, the media playback device 100 decodes the encoded media content 106 for display on a display device 204 (e.g., television) in operable communication with the media playback device 100. For example, the display device 204 may be a separate device from the media playback device 100 that provides an output of the decoded media content (e.g., via a wired or wireless connection). Alternatively, the display device 204 may be integrated within the media playback device 100. In another aspect, the media playback device 100 receives the encoded media content locally (e.g., via DVD insertion, USB connection, etc.).

Figure 3A:
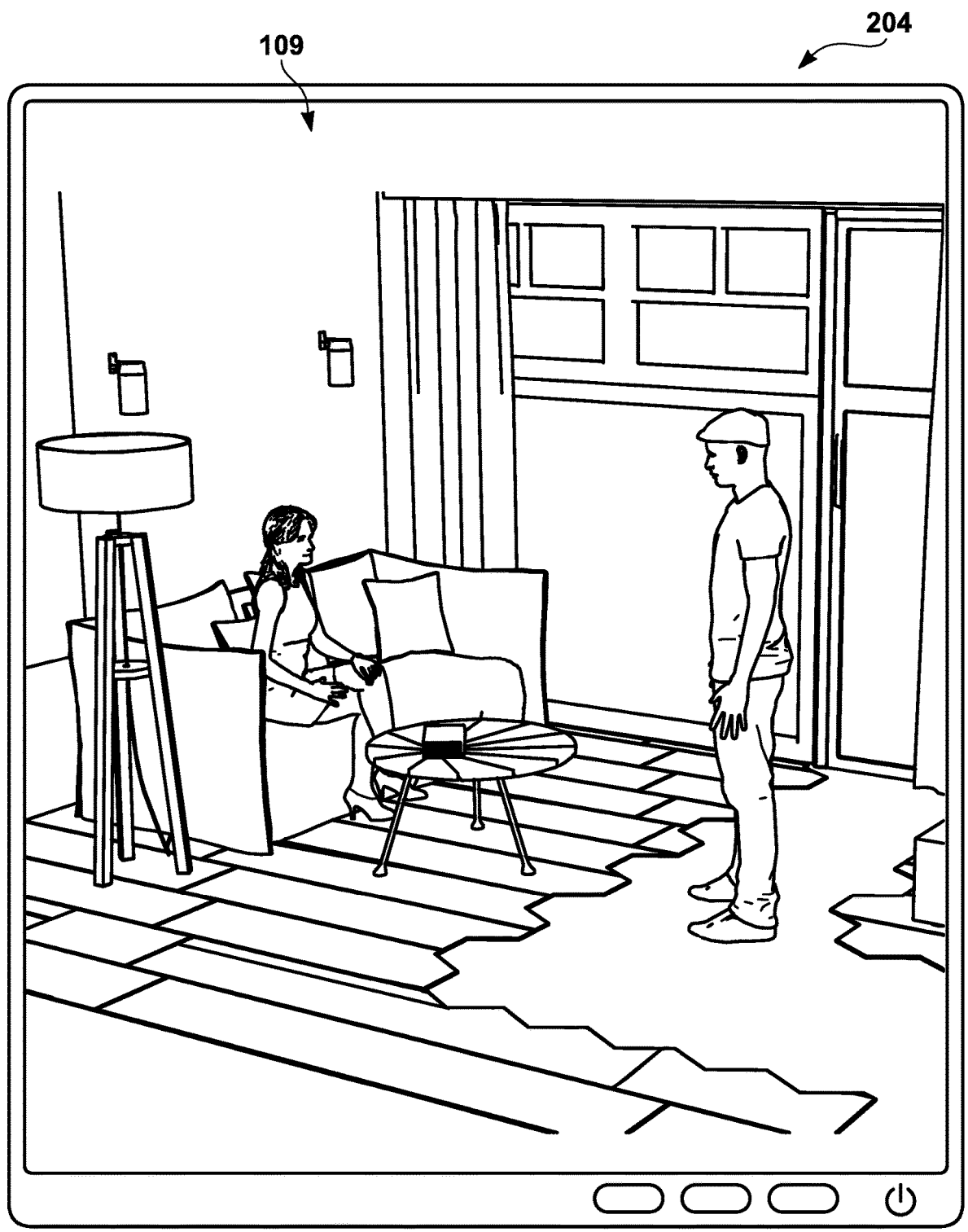
FIG. 3A illustrates an example of one of the sample media files illustrated in FIG. 1 being played back by the media playback device to determine the state.

FIG. 3A illustrates an example of one of the sample media files 109 illustrated in FIG. 1 being played back by the media playback device 100 to determine the state. For instance, the sample media file 109 may be a high-resolution, or other resource-intensive, portion of the media content 106.

Figure 3B:
FIG. 3B illustrates an overlay that may be positioned over the sample media file illustrated in FIG. 3A during playback of the sample media file.

Further, FIG. 3B illustrates an overlay 301 that may be positioned over the sample media file 109 illustrated in FIG. 3A during playback of the sample media file 109. In other words, the media playback device 100 may hide the playback of the sample media file 109, via an overlay 301, so that the user 203 (FIG. 2) does not have to view sample media files 109 during the determination of the state by the media playback device 100. For example, the overlay 301 may be a login screen, diagnostic imagery, graphics corresponding to the media content 106 (e.g., character images), etc.

Figure 4:
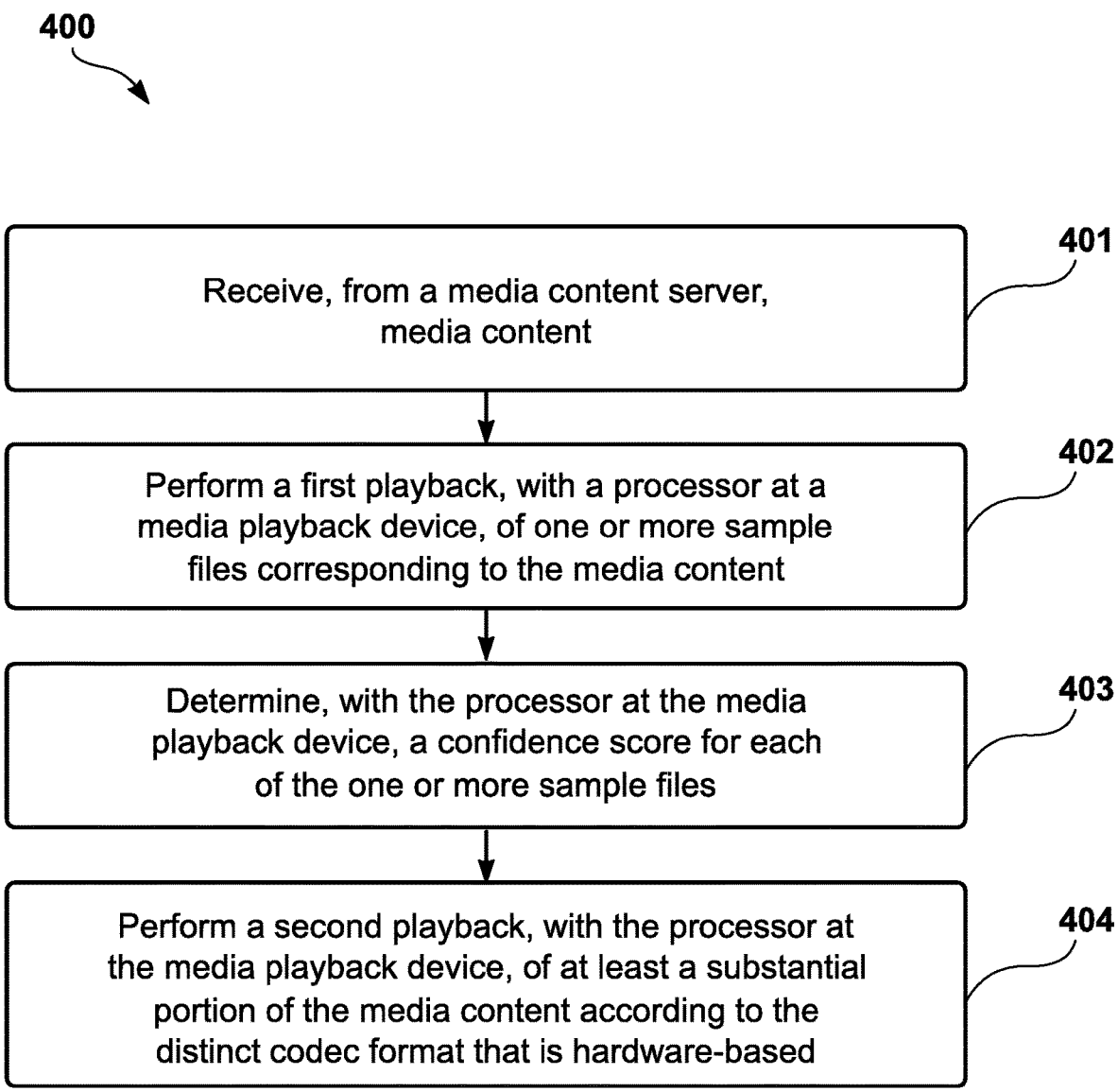
FIG. 4 illustrates a process that may be used to determine a confidence score for the one or more sample media files illustrated in FIG. 1.

FIG. 4 illustrates a process 400 that may be used to determine a confidence score for the one or more sample media files 109 illustrated in FIG. 1. At a process block 401, the process 400 receives, from the media content server 201 (FIG. 2), media content 106 (FIG. 1). Further, at a process block 402, the process 400 performs a first playback, with the processor 101 at the media playback device 100, of one or more sample files 109 corresponding to the media content 106. The one or more sample files each correspond to a distinct codec format. In addition, at a process block 403, the process 400 determines, with the processor 101 at the media playback device 100, a confidence score for each of the one or more sample files 109. The confidence score is associated with one or more factors indicative of the distinct codec format being software-based or hardware-based. Finally, at a process block 404, the process 400 performs a second playback, with the processor 101 at the media playback device 100, of at least a substantial portion of the media content 106 according to the distinct codec format that is hardware-based.

Figure 5:
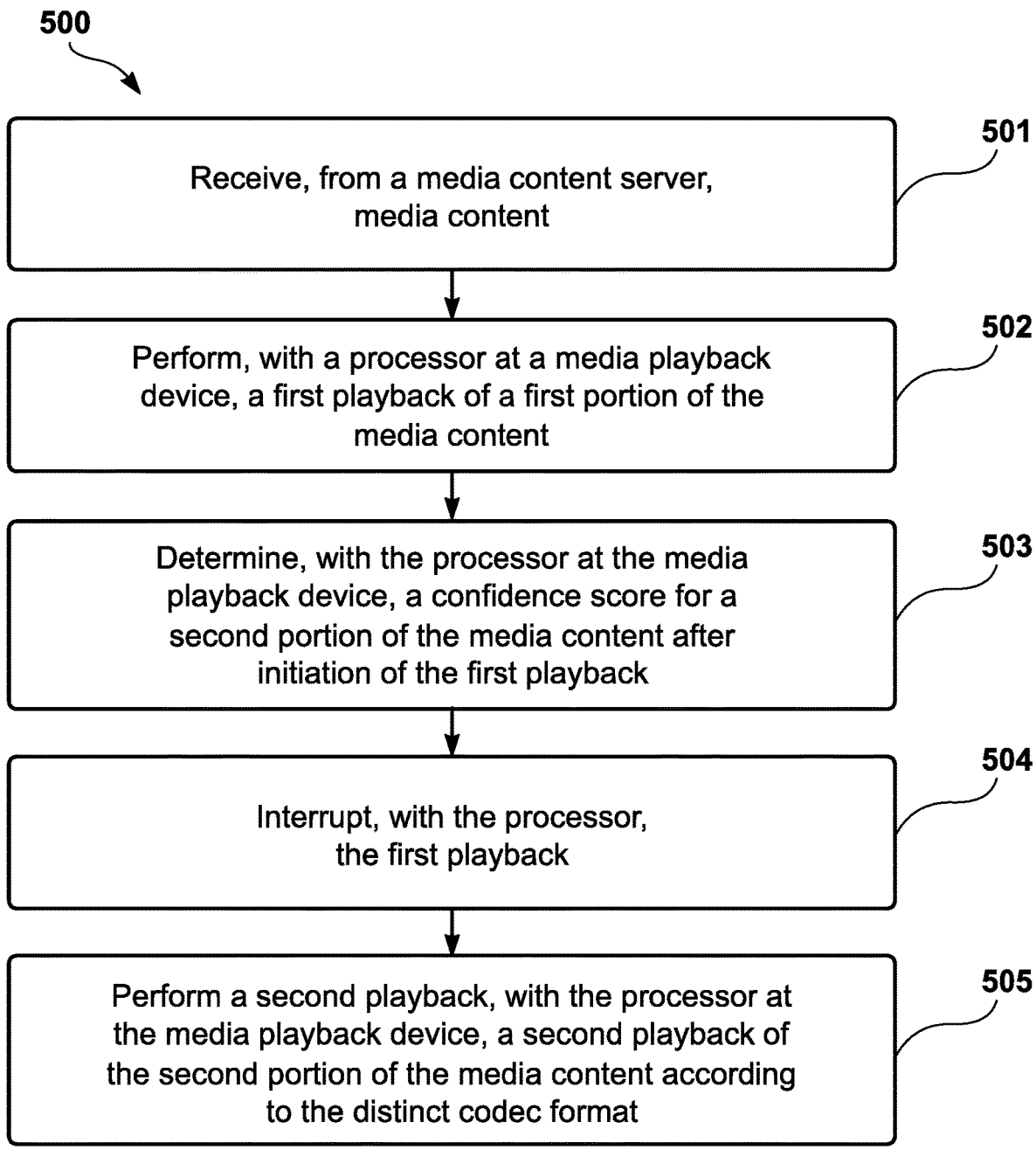
FIG. 5 illustrates another process that may be used to determine a confidence score for the one or more sample media files illustrated in FIG. 1.

FIG. 5 illustrates another process 500 that may be used to determine a confidence score for the one or more sample media files 109 illustrated in FIG. 1. At a process block 501, the process 500 receives, from the media content server 201 (FIG. 2), media content. Further, at a process block 502, the process 500 performs, with the processor 101 at the media playback device 100, a first playback of a first portion of the media content. The first portion of the media content 106 corresponds to a first codec format. In addition, at a process block 503, the process 500 determines, with the processor 101 at the media playback device 100, a confidence score for a second portion of the media content 106 after initiation of the first playback. The confidence score is associated with one or more factors indicative of the second portion corresponding to a second codec format that is software-based or hardware-based. The second codec format is distinct from the first codec format.

Further, at a process block 504, the process 500 interrupts, with the processor 101, the first playback. Finally, at a process block 505, the process 500 performs, with the processor 101 at the media playback device 100, a second playback of the second portion of the media content according to the second codec format.

The processes described herein may be implemented in a specialized, general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a media playback device causes the media playback device to:
   receive, from a media content server, media content;
   identify a codec format in which the media content has been encoded;
   perform a first playback, with a processor at the media playback device, of a plurality of sample files corresponding to the media content, wherein at least one sample file in the plurality of sample files corresponds to the codec format, wherein one or more remaining sample files in the plurality of sample files correspond to one or more additional codec formats, the one or more additional codec formats being distinct from the codec format;
   determine, with the processor at the media playback device, a confidence score for each of the plurality of sample files, the confidence score being associated with one or more factors indicative of each corresponding codec format being software-based or hardware-based; and
   upon a determination, according to the confidence score for the at least one sample file in the plurality of sample files corresponding to the codec format, that the at least one sample file is hardware-based, perform a second playback, with the processor at the media playback device, of at least a substantial portion of the media content according to the codec format.

2. The computer program product of claim 1, wherein the first playback occurs prior to the second playback.

3. The computer program product of claim 1, wherein the one or more factors comprise utilization of resources by the processor.

4. The computer program product of claim 3, wherein the confidence score, for the at least one sample file in the plurality of sample files corresponding to the codec format, is weighted according to the utilization of resources by the processor.

5. The computer program product of claim 1, wherein the one or more factors comprise memory constraints.

6. The computer program product of claim 1, wherein each of the plurality of sample files has a duration that is less than that of the media content.

7. The computer program product of claim 1, wherein each of the plurality of sample files has a high resolution.

8. The computer program product of claim 1, wherein the codec format is selected from the group consisting of: HEVC, AVC, and AV1.

9. The computer program product of claim 1, wherein the first playback is invisible to a user viewing a display device, in operable communication with the media playback device, during the first playback.

10. The computer program product of claim 9, wherein the media playback device is further caused to render an overlay over the first playback such that the first playback is invisible.

11. The computer program product of claim 10, wherein the overlay comprises a login screen, a diagnostic screen, or imagery associated with the media content.

12. A computer program product comprising a non-transitory computer readable storage device having a computer readable program stored thereon, wherein the computer readable program when executed on a media playback device causes the media playback device to:
- receive, from a media content server, media content;
- identify a codec format in which the media content has been encoded;
- perform, with a processor at the media playback device, a first playback of a first portion of the media content, the first portion of the media content corresponding to a first codec format;
- determine, with the processor at the media playback device, a confidence score for a second portion of the media content after initiation of the first playback, the confidence score being associated with one or more factors indicative of the second portion corresponding to a second codec format that is software-based or hardware-based, the second codec format being distinct from the first codec format;
- upon a determination, according to the confidence score, that the second codec format is hardware-based, interrupt, with the processor at the media playback device, the first playback; and
- subsequent to interruption of the first playback, perform, with the processor at the media playback device, a second playback of the second portion of the media content according to the second codec format.

13. The computer program product of claim 12, wherein the first playback occurs prior to the second playback.

14. The computer program product of claim 12, wherein the one or more factors comprise utilization of resources by the processor.

15. The computer program product of claim 14, wherein the confidence score is weighted according to the utilization of resources by the processor.

16. The computer program product of claim 12, wherein the one or more factors comprise memory constraints.

17. An apparatus comprising:
a processor programmed to:
- receive media content from a media content server,
- identify a codec format in which the media content has been encoded,
- perform a first playback of a plurality of sample files corresponding to the media content, wherein at least one sample file in the plurality of sample files corresponds to the codec format, wherein one or more remaining sample files in the plurality of sample files correspond to one or more additional codec formats, the one or more additional codec formats being distinct from the codec format,
- determine a confidence score for each of the plurality of sample files, the confidence score being associated with one or more factors indicative of each corresponding codec format being software-based or hardware-based, and
- perform a second playback of at least a substantial portion of the media content according to the codec format upon a determination, according to the confidence score for the at least one sample file in the plurality of sample files corresponding to the codec format, that the at least one sample file is hardware-based.

18. The apparatus of claim 17, wherein the processor is positioned within a media playback device.

19. The apparatus of claim 17, wherein the codec format is selected from the group consisting of: HEVC, AVC, and AV1.

20. The apparatus of claim 17, wherein the one or more factors comprise utilization of resources by the processor.

21. The computer program product of claim 1, wherein the media playback device is further caused to:
upon a determination, according to the confidence score for at least one of the one or more remaining sample files in the plurality of sample files corresponding to the one or more additional codec formats, that the at least one of the one or more remaining sample files is hardware-based:
- request, from the media content server, at least a substantial portion of the media content according to the additional codec format corresponding to the at least one of the one or more remaining sample files,
- receive, from the media server, the substantial portion of the media content according to the additional codec format, and
- perform, with the processor at the media playback device, the second playback of at least the substantial portion of the media content according to the additional codec format.

* * * * *

UNITED STATES PATENT AND TRADEMARK OFFICE
CERTIFICATE OF CORRECTION

PATENT NO. : 10,735,806 B2
APPLICATION NO. : 16/125250
DATED : August 4, 2020
INVENTOR(S) : Derek L. Prestegard et al.

It is certified that error appears in the above-identified patent and that said Letters Patent is hereby corrected as shown below:

In the Claims

In Column 8, Line 37, in Claim 21, after "media" insert -- content --.

Signed and Sealed this
Third Day of November, 2020

Andrei Iancu
*Director of the United States Patent and Trademark Office*